Aug. 8, 1972 R. W. GUNDLACH 3,682,628

PHOTOELECTROPHORETIC FACSIMILE TRANSMISSION SYSTEM

Filed Dec. 9, 1970

INVENTOR.
*Robert W. Gundlach*

BY

*William Kaufman*

ATTORNEY

United States Patent Office 3,682,628
Patented Aug. 8, 1972

3,682,628

PHOTOELECTROPHORETIC FACSIMILE TRANSMISSION SYSTEM

Robert W. Gundlach, Victor, N.Y., assignor to Xerox Corporation, Rochester, N.Y.

Filed Dec. 9, 1970, Ser. No. 96,513
Int. Cl. G03g *13/22*
U.S. Cl. 96—1.2 5 Claims

ABSTRACT OF THE DISCLOSURE

A method of photoelectrophoretic imaging is provided comprising:

Figure 1:
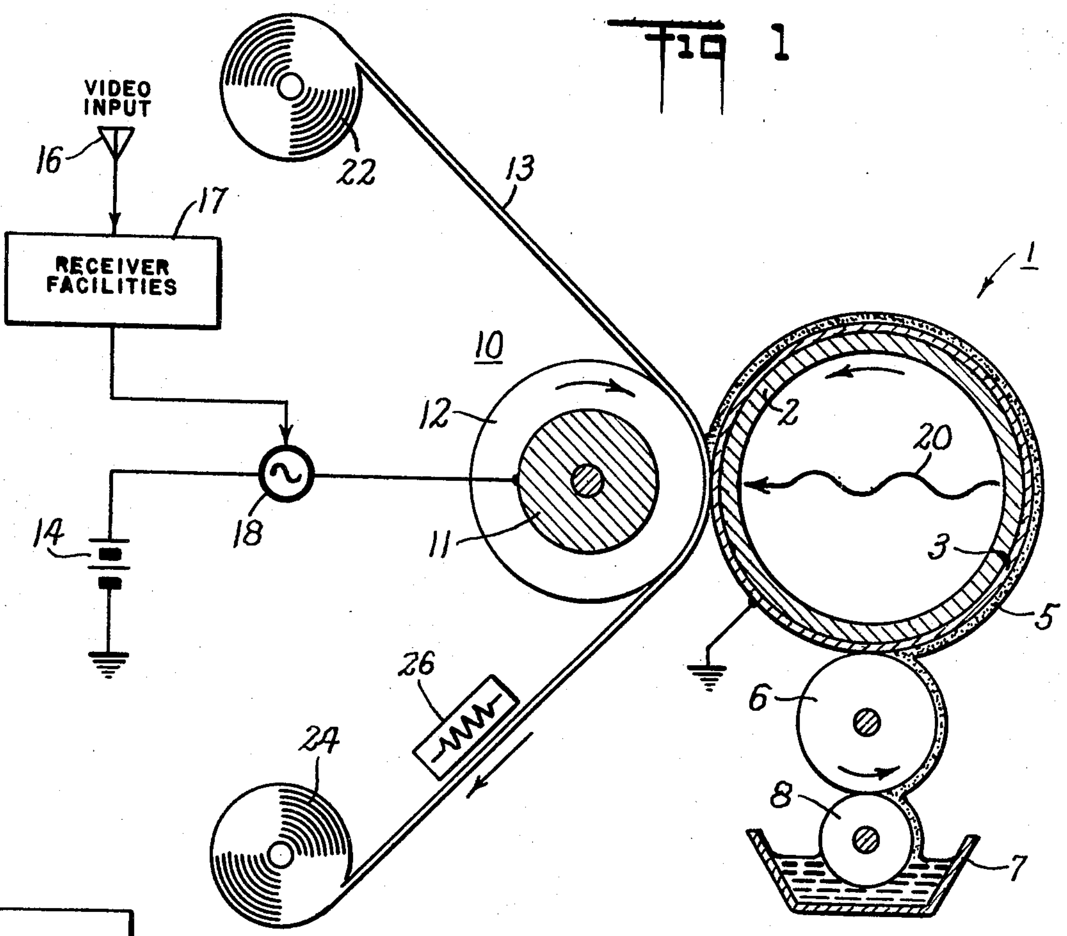

(i) applying a layer of an imaging suspension between a pair of electrodes, at least one of which is partially transparent, said imaging suspension comprising a plurality of finely divided electrically photosensitive particles in a carrier liquid;

(ii) subjecting said suspension to an applied electric field between said electrodes having a field strength of from about 0.1 to about 1.0 volt/micron, whereby electrophoretic deposition of said particles onto the transparent electrode occurs;

(iii) paraxially scanning said transparent electrode with a source of uniform electromagnetic radiation;

(iv) applying an input electrical signal to the other electrode comprising a modulated voltage having a field strength in excess of about 10 volts/micron, whereby upon coincidence of said scanning uniform light source and said modulated voltage, photoelectrophoretic charge exchange and reverse particle migration occurs to said other electrode resulting in image formation.

This invention relates to photoelectrophoretic imaging systems. More particularly, this invention relates to the application of photoelectrophoresis to facsimile transmission.

In a conventional facsimile system, an original document is scanned by a sharply focused light spot from a light source such as the electron beam cathode ray tube. The reflected light from the document scanned is intercepted and translated into electro-temporal signals by a photomultiplier tube. The intelligence-bearing electro-temporal signal is, in turn, transmitted to a receiving station in a remote location. At this station, the electrical signal is used to modulate a similar scanning beam of a cathode ray tube in an optical system. Finally, in a read and/or print-out station, that in most instances would be a photosensitive reproduction system, the modulated scanning beam is translated into a light-spatial facsimile of the original document.

In recent years, many systems have been developed for converting pictorial and document images from light-spatial to electro-temporal forms, usually for purposes of recording and/or transmitting. All such systems, as for example, television, telephone copiers, video tape recorders, long distance electrostatographic facsimile recording and the like, involve as an initial step, the conversion of light-spatial information to an electro-temporal form. After transmission of the electro-temporal signals to a desired location, the signals are converted to viewable light-spatial images usually by a cathode ray tube (CRT) display. If a permanent record of the display is required, a photograph, xerocopy or the like is usually made of the CRT display.

Photoelectrophoretic imaging systems have also recently been developed wherein an image is formed from an imaging suspension or ink by subjecting the ink to an electric field and exposing it to activating electromagnetic radiation, e.g. visible light. The imaging suspension is comprised of light sensitive particles suspended within an insulating liquid carrier and believed to bear a net electrical charge while in suspension. Normally, the ink is placed between injecting and blocking electrodes used to establish an electric field of essentially constant magnitude and is exposed to a variable light image through one of the electrodes which is at least partially transparent. According to one theory, particles attracted to the injecting electrode by the electric field exchange charge with the injecting electrode when exposed to light and migrate under the influence of the field through the liquid carrier to the blocking electrode. As a result of the migration, positive and negative images are formed on the two electrodes. The blocking electrode is a conductive core covered with a dielectric material to prevent charge exchange with the particles and thereby prevent the particles from oscillating back and forth between the two electrodes.

An extensive and detailed description of the photoelectrophoretic process is found in U.S. Pats. 3,384,565 and 3,384,484 to Tulagin and Carreira, 3,383,993 to Yeh and 3,384,566 to Clark. The disclosures contained in these patents are expressly incorporated by reference into the present disclosure.

Although the photoelectrophoretic imaging systems described hereinabove could be employed for reproduction of the visible image generated on the CRT device at the receiving station of a facsimile transmission system, it would be highly desirable to provide a system wherein photoelectrophoresis is applied to a facsimile transmission system and employed in a manner whereby the electro-temporal signal can be applied directly to the imaging system thereby avoiding the need for a CRT device and the equipment associated therewith at the receiving station. The economic advantages of eliminating such costly equipment, both in terms of money and space, are readily apparent.

Accordingly, it is an object of the present invention to provide apparatus and methods enabling the application of photoelectrophoresis to facsimile transmission systems.

It is another object of the present invention to provide a facsimile transmission system wherein the use of a CRT device at the receiving station is eliminated.

It is still another object of the present invention to provide a photoelectrophoretic imaging system which can create a light spatial image directly from an electro-temporal signal.

It is a still further object of the present invention to provide a facsimile transmission system for full color reproduction wherein color correction and contrast control can be effected electronically.

These as well as other objects are accomplished by the present invention which, in one aspect thereof, provides a method of photoelectrophoretic imaging comprising:

(i) Applying a layer of an imaging suspension between a pair of electrodes, at least one of which is partially transparent, said imaging suspension comprising a plurality of finely divided electrically photosensitive particles in a carrier liquid;

(ii) Subjecting said suspension to an applied electric field between said electrodes having a field strength of from about 0.1 to about 1 volt/micron, whereby electrophoretic deposition of said particles onto the transparent electrode occurs;

(iii) Paraxially scanning said transparent electrode with a source of uniform electromagnetic radiation;

(iv) Applying an input electrical signal to the other electrode comprising a modulated voltage having a field strength in excess of about 10 volts/micron, whereby upon coincidence of said scanning uniform light source and said modulated voltage, photoelectrophoretic charge exchange and reverse particle migration occurs to said other electrode, resulting in image formation.

Figure 2:
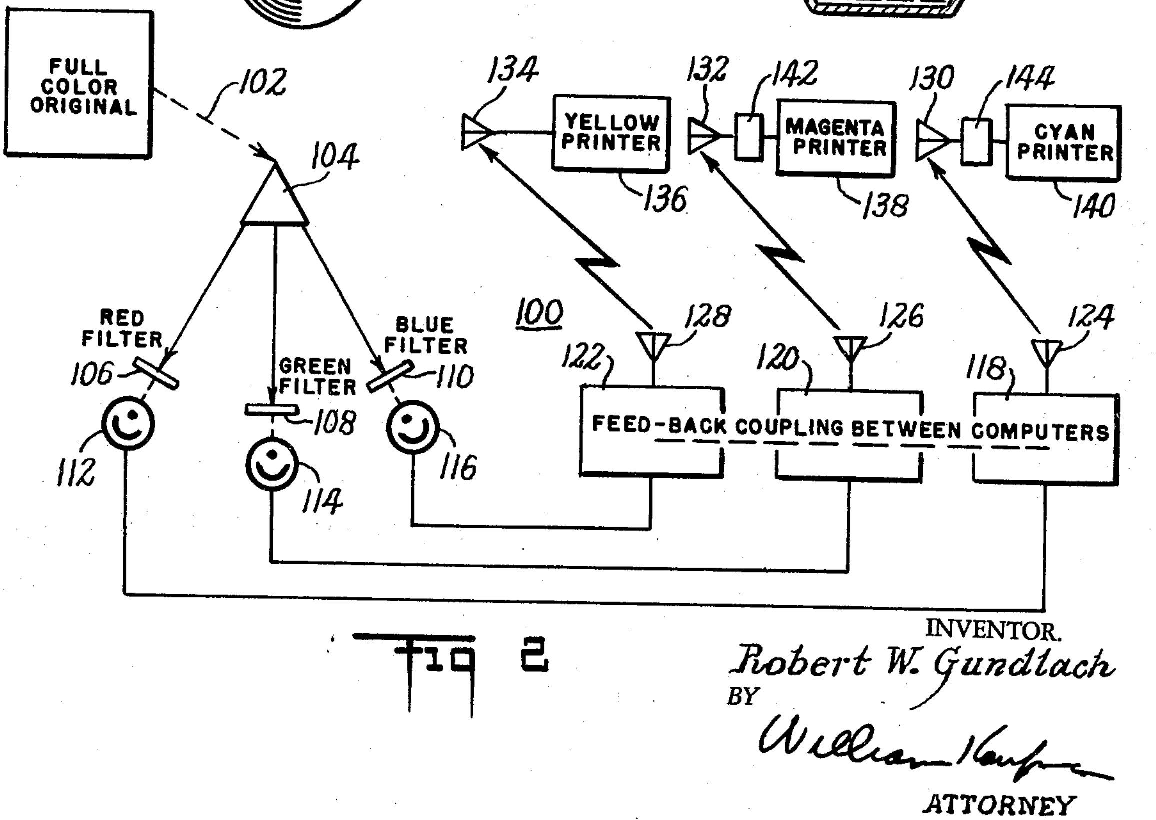

The above and still further objects, features and advantages of the present invention will become apparent upon consideration of the following detailed disclosure of the invention, especially when taken in conjunction with the accompanying drawing wherein:

FIG. 1 schematically illustrates a monochromatic printer in accordance with the present invention;

FIG. 2 schematically illustrates a full color facsimile transmission system in accordance with one aspect of the present invention.

Referring now to FIG. 1, there is seen a continuous photoelectrophoretic monochromatic printer comprising transparent injecting electrode 1 and blocking electrode 10. The injecting electrode 1, in the instant illustration, is represented as consisting of a layer of optically transparent glass 2 overcoated with a thin optically transparent layer of tin oxide 3. Tin oxide coated glass of this nature is commercially available under the trade name "NESA" glass. A uniform layer of the imaging suspension 5 of the present invention is coated on the surface of the injecting electrode by an applicator 6 of any suitable design or material, such as a urethane coated cylinder, which may rotate in the same direction or, as herein represented, in the opposing direction to the transparent cylinder. The function of the ink applicator is to apply a thin film of the imaging suspension from ink sump 7 by way of roller 8 to the transparent cylinder. In close proximity to the transparent injecting electrode 1 is a second rotary blocking electrode 10 having a conductive central core 11 which is covered with a layer of material 12, the function of which is to block the rapid exchange of electric charges between the particles and the electrode 1, such as polyurethane. Although this layer of material need not necessarily be used in this system, the use of such a layer is preferred because of the markedly improved results which it is capable of producing. A detailed description of the improved results and the types of materials which may be employed as the blocking layer many be found in U.S. Pat. No. 3,383,993. It is considered preferable that the blocking electrode be as small in diameter as possible in order to reduce the total contact area between the injecting and blocking electrodes. This is especially important for high speed, high frequency signals where high power is required just to charge and discharge the surfaces of said injecting and blocking electrodes in the nip.

A receiver sheet 13 is driven between electrodes 1 and 10 as represented, with an ink image being selectively deposited on the receiver sheet in the imaging zone. A residual image pattern opposite in image sense to the image developed on the receiver sheet is formd on the NESA glass cylinder which is removed at the ink application station. Thus the applicator performs both the ink application and residual image removal steps.

It has been found that electrophoretic deposition of pigment particles from an insulating suspension medium to the surface of the injecting electrode can occur under the influence of relatively weak fields such as from about 0.1 to about 1.0 volt/micron. Photoelectrophoretic charge exchange and reverse migration of the particles in the presence of activating electromagnetic radiation requires fields in excess of about 10 volts/micron. Thus, in accordance with the present invention, a uniform field is established across the imaging zone of from about 0.1 to about 1.0 volt/micron by power source 14 resulting in the deposition of the pigment particles on the surface of the injecting electrode 1.

In order to obtain a facsimile of an image being transmitted from a distant transmission facility, the electrotemporal signal or video signal is received by antenna 16 and suitable receiving facilities 17 which are adapted to supply the necessary image information as a modulated voltage 18 to the conductive core 11 of the blocking electrode 10. Coincidentally therewith, a uniformly (in time) bright point of light 20 is scanned paraxially along the drum surface of the injecting electrode 1 by means of rotating mirrors (not shown). Upon coincidence of the high field created by the modulated voltage and the illumination, the pigment particles exchange charge with the injecting electrode and reverse polarity and migrate toward the blocking electrode or, in the instance of the above-described illustration migrate to the surface of intervening receiver paper sheet 13. Where illumination is not accompanied by a high field, only negligible charge is lost. Throughout the entire operation, the injecting roller electrode 1 is connected to ground.

Thus, in accordance with the present invention a facsimile transmission system is provided whereby the video input in the form of a modulated voltage can be directly employed to activate a photoelectrophoretic imaging system. As described above, as the imaging suspension 5 enters the imaging zone formed in the nip between the counter-rotating injecting and blocking roller electrodes, it is subjected to a uniformly weak field of, for example, 1 volt/micron causing deposition of the pigment particles therein onto the injecting electrode. This weak field is of sufficient strength to cause such particle deposition but is insufficient, in itself or in the presence of illumination, to cause charge exchange of the particles with the injecting electrode and reverse migration thereof to the blocking electrode. Also, within the nip, the deposited particles on the surface of the transparent injecting electrode are paraxially scanned with a uniformly bright point of light. Because of the transparent nature of the injecting electrode, a concentrated light source can be adapted, by means of rotating mirrors or the like to paraxially scan the surface of said electrode. The light source can be any convenient source of actinic electromagnetic radiation to which the photosensitive particles in the imaging suspension exhibit response.

The video input to the system can be derived from any optical scanner such as a T.V. camera, graphic arts color scanner, video tape or the like which converts the light-spatial image to an electro-temporal signal. The signal density, contrast and the like can be electronically adjusted for transmission and the signal can be transmitted to a distant location. At said location, the signal is received and fed as a modulated voltage to the blocking electrode. When the modulated signal and the scanning uniform illumination coincide within the imaging zone, the particles on the injecting electrode exchange charge therewith and migrate toward the blocking electrode or, in this instance, the receiver web 13, in conformity with the modulated voltage signal thereby generating a facsimile of the image transmitted. The receiver sheet 13 herein represented in the form of a paper web is fed from supply roll 22 passing through the imaging zone or nip formed by the blocking and injecting electrodes and is rewound on takeup roller 24. A heated metallic shoe 26 in contact with the underside of the paper web supplies the energy for fixing the image formed thereon.

The voltage of the video input signal applied to the blocking electrode which is considered necessary for imaging to occur can vary widely. It is preferred in order to obtain a good image resolution that the potential be such as to create an electric field of at least about 10 volts per micron and most preferably at least about 60 volts per micron across the imaging layer. The applied potential necessary to obtain the desired field strength will of course vary depending upon the interelectrode gap and upon the thickness and type of blocking material used on the respective imaging electrode surface. Voltages as high as 8,000 volts have been applied to produce images of high quality. The upper limit of the field strength is limited only by the breakdown potential of the suspension and blocking electrode material.

The pigment image formed, whether it be on a removable blocking electrode layer attached to the conductive core of the imaging roller or to a receiver copy sheet may be fixed in place, for example, by placing a lamination over its top surface such as by the utilization of a heated metallic shoe which is in contact with the underside of the paper web as in the present illustration. When a fusible polymeric material such as thermoplastic resin is utilized in conjunction with the pigment particles, the system of the present invention presents a built-in image fixing mechanism when utilizing heat fixing or vapor fixing techniques. In addition, the application of heat further assists in the fixing process by accelerating the solvent removal from the image areas. If desired, the image may be transferred to a secondary substrate to which it is in turn fixed.

If the image is formed on a permanent electrode surface and the intervening receiver sheet is eliminated, it will be found desirable to transfer the image from the electrode and fix it on a secondary substrate so that the electrode may be reused. Such a transfer step may be carried out by adhesive pick off techniques or preferably by electrostatic field transfer. If the blocking electrode is covered with a transfer paper sleeve or as illustrated a web is passed between the contacting surfaces of the injecting and blocking electrodes or if the blocking material utilized consists of a removable sleeve, such as Tedlar, this intervening substrate will pick up the complete image on the initial pass and need only be removed to produce the final usable copy. All that is required is to replace the substrate with a similar material. In the present configuration, images are produced directly on a paper receiving sheet or other substrate with the image formed on the NESA or transparent cylinder removed by the action of the ink applicator. However, if desired the image formed on the NESA cylinder need not be discarded but may be utilized by offsetting the image from the NESA cylinder onto the surface of a conventional receiving sheet such as described above. Any suitable material may be used as the receiving substrate for the image produced such as paper as represented in the illustration or other desirable substrates. For example, if one desires to prepare a transparency the use of a Mylar or Tedlar sheet might be desirable.

When used in the course of the present invention, the term injecting electrode should be understood to mean that it is an electrode which will preferably be capable of exchanging charge with the photosensitive particles of the imaging suspension when the suspension is exposed to light so as to allow for a net change in the charge polarity on the particle. By the term blocking electrode is meant one which is capable of injecting the electrons into or receiving electrons from the above mentioned photosensitive particles at a negligible rate as compared to the injecting electrode when the particles come into contact with the surface of the electrode.

It is preferred that the injecting electrode be composed of an optically transparent material, such as glass, overcoated with a transparent or semi-transparent conductive material such as tin oxide, indium oxide, copper iodide, aluminum or the like; however, other suitable materials including many semiconductive materials such as raw cellophane, which are ordinarily not thought of as being conductors but which are still capable of accepting injected charge carriers of the proper polarity under the influence of an applied electric field may be used. The use of more conductive materials allows for cleaner charge separation and prevents possible charge buildup on the electrode, the latter tending to diminish the electric field across the suspension in an undesirable manner.

The blocking electrode, on the other hand, is selected so as to prevent or greatly retard the injection of electrons into the photosensitive pigment particles when the particles reach the surface of this electrode. The core of the blocking electrode generally will consist of a material which is fairly high in electrical conductivity. Typical conductive materials include conductive rubber, steel, aluminum, copper and brass. Preferably, the core of the electrode will have a high electrical conductivity in order to establish the required polarity differential in the system; however, if a material having a low conductivity is used, a separate electrical connection may be made to the back of the blocking layer of the blocking electrode. For example, the blocking layer or sleeve may be a semiconductive polyurethane material having a conductivity of from about $10^{-8}$ to $10^{-9}$ ohm-cm. If a hard rubber non-conductive core is used, then a metal foil may be used as a backing for the blocking sleeve. Although a blocking electrode material need not necessarily be used in the systen, the use of such a layer is preferred because of the markedly improved results which it is capable of producing. It is preferred that the blocking layer, when used, be either an insulator or a semiconductor which will not allow for the passage of sufficient charge carriers, under the influence of the applied field, to discharge the particles finely bound to its surface thereby preventing particle oscillation in the system. The result is enhanced image density and resolution. Even if the blocking layer does allow for the passage of some charge carriers to the photosensitive particles it still will be considered to fall within the class of preferred materials if it does not allow for the passage of sufficient charge so as to recharge the particles to the opposite polarity. Exemplary of the preferred blocking materials used are baryta paper, Tedlar a polyvinylfluoride, Mylar (polyethylene terephthalate), and polyurethane. Any other suitable material having resistivity of from about $10^7$ ohms-cm. or greater may be employed. Typical materials in this resistivity range include cellulose acetate coated papers, cellophane, polystyrene and polytetrafluoroethylene. Other materials that many be used in the injecting and blocking electrodes and other photosensitive particles which can be used as the photomigratory pigments and the various conditions under which the system operates may be found in the above cited issued patents U.S. Pat. Nos. 3,384,565 and 3,384,566 as well as U.S. Pat. Nos. 3,384,488 and 3,389,993.

Any suitable electrically photosensitive particle or mixtures of such particles may be used in carrying out the invention, regardless of whether the particular particle selected is organic, inorganic and is made up of one or more components in solid solution or dispersed one in the other or whether the particles are made up of multiple layers of different materials. Typical photosensitive materials include substituted and unsubstituted organic pigments such as phthalocyanines such as, Monarch Blue G, the beta crystal form of copper phthalocyanine available from Hercules, Inc., quinaridones such as, Monastral Red B, a quinacridone pigment available from Du Pont, Algol Yellow (1,2,5,6 - di(C,C′-diphenyl)-diazoanthraquinone) (C.I. 67300), Irgazine Red, tri-sodium salt of 2-carboxyl phenyl azo(2-naphthiol-3,6-disulfonic acid) (C.I. 16105), a yellow pigment identified as Yellow 96 comprising N-2″pyridyl-8,13 - dioxodinaphtho - (2,1 - b; 2′,3′-d(-furan-6-carboxamide, 3-benzylidene amino-carbazole, 3-amino-carbazole, Watchung Red B (1,4′-methyl-5′-chloro-azobenzene-2′sulfonic acid) - 2 - hydroxy - 3 - naphthoic acid) (C.I. 15865) and inorganic pigments such as cadmium sulfide, cadmium selenide, selenium, antimony sulfide, zinc oxide, arsenic sulfide and the like. A more extensive listing of suitable materials can be found in U.S. Pat. 3,384,488.

As stated above, any suitable particle structure may be employed. Typical particles include those which are made up of only the pure photosensitive material or a sensitized form thereof, solid solutions or dispersions of the photosensitive material in a matrix such as thermoplastic or thermosetting resins, copolymers of photosensitive pigments and organic monomers, multilayers of particles in which the photosensitive material is included in one of the layers and where other layers provide light filtering action in an outer layer or a fusable or solvent softenable core of resin or a core of liquid such as dye or other marking material or a core of one photosensitive material coated with an overlayer of another photosensitive material to achieve broadened spectral response. Other photosensitive structures include solutions, dispersions, or copolymers of one photosensitive material in another with or without other photosensitively inert materials.

While the above structural and compositional variations are useful, it is preferred that each particle be primarily composed of an electrically photosensitive pigment, such as those listed above, wherein the pigment is both the primary electrically photosensitive ingredient and the primary colorant for the particle. These particles have been found to give optimum photographic sensitivity and highest overall image quality in addition to being simple and economical to prepare. Of course, it may often be desirable to include other ingredients, such as spectral or electrical sensitizers or secondary colorants and secondary electrically photosensitive materials.

Any suitable insulating carrier liquid may be used with the pigments to form the imaging suspension of the present invention. Typical vehicles include decane, dodecane, tetradecane, Sohio Solvent 3454, a kerosene fraction available from Standard Oil Company of Ohio, dimethyl-siloxane, olive oil, linseed oil, mineral oil, cottonseed oil, marine oils such as sperm oil and cod liver oil and mixtures thereof.

In the monochromatic printers of the present invention, the particles included in the imaging suspension may be virtually any color in which it is desired to produce the final image such as gray, black, red, yellow, etc. and the particular point or range of its spectral response is relatively immaterial as long as it shows response in some region of the visible spectrum which can be matched by a convenient exposure source. There should, however, be substantial coincidence between the primary spectral absorption range and the primary photosensitive response range of the particles to insure high photographic sensitivity in the system. In fact, the particles may vary in response from one with a very narrow response band all the way up to one having panchromatic response. Thus, for example, if it is desired to produce very intense black images, it may be preferred to produce this result by employing two or more differently colored pigments in the system which when combined will produce a black image. In this letter instance, considerable overlap and even coincidence of the spectral response curves of the different pigments may be necessary and may even be preferred so that all of the pigments employed in the system will respond in a substantially similar way to generally available light sources which are not uniformly panchromatic in their light output. Clearly, if a white light source is used, this overlap is not a requirement.

The printer shown in FIG. 1 and described herein is adapted to print monochromatically; however, full color synthesis can similarly be obtained by establishing three similar printers in series, each one printing monochromatically but with magenta, cyan and yellow pigments, respectively, to ultimately provide full color synthesis in the final product.

Full color synthesis generally requires color correction in the preparation of the reproduction so that the reproduction will visually appear to correspond color-wise with the original in terms of hue, saturation and brightness. Such correction is usually necessary because presently known pigments have non-ideal properties of absorption and reflectivity with respect to their respective portions of the visible light spectrum. Yellow pigments are generally closest to the ideal absorbing substantially blue light only. Magenta and cyan pigments, unfortunately deviate considerably from the ideal model, Magenta pigments primarily absorb green light but also absorb blue light. Cyan pigments primarily absorb red light but also absorb blue and green light. Consequently, color correcting normally involves reducing the density of yellow pigment deposited in those areas of the copy which will also ultimately contain magenta and cyan pigments because too much blue light is otherwise absorbed in those areas. The quantity of yellow pigment removed is generally proportional to the excess quantity of blue light being absorbed, i.e., proportional to the density of the magenta and cyan in the same area. Similarly, the density of the magenta pigment is reduced in those areas of the copy also containing cyan pigment because too much green light is otherwise being absorbed in those areas. Here, the quantity of magenta pigment removed is generally proportioned to the density of the cyan pigment.

Photographic color masks have heretofore been commonly used to effect the desired reduction in pigment densities, i.e., the color correction. The intensities or brightness levels of the blue, green and red light emitted from and original are inversely proportional to the density of the yellow, magenta and cyan colors in the original, respectively. Black and white photographic negatives recording the intensities of the blue, green and red light emissions, however, transmit light having intensities directly proportional to the densities of the yellow, magenta and cyan areas in the original. The three negatives are termed color separation negatives and the light transmitted by them is used to determine the location and density of the yellow, magenta and cyan pigments in a final color reproduction. Black and white photographic positives made from the green and red separation negatives are the most commonly used color masks. The green and red separation positives are superimposed over the blue separation negative and reduce the intensity of the transmitted light, e.g., the density of yellow pigment, in the yellow areas of the original also containing magenta and cyan. Similarly, the red separation positive is superimposed over the green separation negative and reduces the intensity of the transmitted light, i.e., the density of the magenta pigments, in the magenta areas of the original also containing cyan. Because of the amount of materials and the number of steps involved, these color correction techniques have proven expensive and time consuming.

One significant advantage of the present invention is the ability to effect color correction without the expensive and time consuming techniques heretofore employed. In accordance with the present invention, three modulated electro-temporal signals are generated by an electronic color scanner. These signals, corresponding to color separation images, provide an electronic color correction capability. As shown in FIG. 2, these signals are fed to computers which are adapted through feedback coupling therebetween to alter or distort the signals to effect color correction and contrast control, if desired or necessary. Functionally, the color correction circuitry examines the signals to determine the intensity or brightness of the color they represent and changes the intensity in accordance with conventional color correction techniques. For example, in a system using signal amplitude to represent intensity, the amplitudes of the blue and green video signals are increased where the amplitude of the red signal is low and the amplitude of the blue signal is increased where the amplitude of the green signal is low. The changes in the signals compensate for the non-ideal response of yellow, magenta and cyan pigments in the copy to the full spectrum of white light.

Contrast control can be effected by the computer by automatically distorting or adjusting the input signals to compensate for the non-ideal characteristics of the reproduction system. The result of such compensation is to match the contrast density of the reproduction with that of the original. For example, if the reproduction system gives excessive contrast, the input signal is adjusted by the computers to present a low contrast original image signal to the printers.

Full color facsimile transmission can be accomplished by the present invention as shown in FIG. 2.

Referring now to FIG. 2, there is shown an electronic color scanner, generally referred to as 100, wherein a scanner light beam 102 is either passed through a color transparency (as shown) or reflected from a color original to a beam splitter 104 where the light beam is split and passed through red, green and blue filters, 106, 108 and 110, respectively, to separate the light image into its red, green and blue components. The respective components activate photocells 112, 114 and 116, respectively, converting the separated color components of the light image into electro-temporal signals which are fed to electronic computers 118, 120 and 122 wherein through feedback coupling between the computers color correction and/or contrast control can be effected. The resulting video signals are transmitted via antennas 124, 126 and 128 to a distant location where they are received by receiver antennas 130, 132 and 134 and fed to the receiver facilities of three printers 136, 138 and 140 respectively of the type shown in FIG. 1 and described in detail hereinabove. These signals now in the form of modulated voltages each corresponding to color corrected separations of the original full color image, are employed to activate the photoelectrophoretic printers. The modulated voltage fed to printer 136 corresponds to the blue component of the original image. This printer is adapted to develop the image generated therein solely with a yellow photosensitive pigment dispersion. The resulting yellow separation print is passed to printer 138. The modulated signal being received by printer 138 corresponds to the green component of the original image. The modulated signal is appropriately delayed as by time delay 142 to enable the yellow print to be transferred to printer 138 and for the image generated therein to be superimposed upon said yellow image. Printer 138 is adapted to develop the image generated therein solely with a magenta photosensitive pigment dispersion. The resulting print containing the magenta image superimposed on the yellow image is fed to printer 140. The signal fed to printer 140 is similarly appropriately delayed such as by time delay 144 to enable transfer of the print in printer 140 and superimposition of the generated image thereon. Printer 140 is adapted to develop the image generated therein solely with a cyan photosenstitive pigment dispersion, the net result of which is the production of a full color facsimile of the original.

Thus, the present invention provides means whereby monochromatic or full color facsimiles can be reproduced at locations distant from the original. Moreover, by providing a reproduction system which directly utilizes the transmitted video signals, color correction and contrast control can be effected electronically, thereby substantially simplifying color reproduction and greatly reducing the costs involved.

Other modifications of the present invention will occur to those skilled in the art upon a reading of the present disclosure. These are intended to be included within the scope of this invention.

What is claimed is:

1. A method of photoelectrophoretic imaging comprising:

(i) applying a layer of an imaging suspension between a pair of electrodes, at least one of which is partially transparent, said imaging suspension comprising a plurality of finely divided electrically photosensitive particles in a carrier liquid;

(ii) subjecting said suspension to an applied electric field between said electrodes having a field strength of from about 0.1 to about 1.0 volt/micron, whereby electrophoretic deposition of said particles onto the transparent electrode occurs;

(iii) paraxially scanning said transparent electrode with a source of uniform electromagnetic radiation;

(iv) applying an input electrical signal to the other electrode comprising a modulated voltage creating a field strength in excess of about 10 volts/micron, whereby upon coincidence of said scanning uniform light source and said modulated voltage, photoelectrophoretic charge exchange and reverse particle migration occurs to said other electrode resulting in image formation.

2. A method of facsimile transmission from a transmission station to a receiving station and photoelectrophoretic reproduction at said receiving station comprising the steps of:

(1) at the transmission station:

(a) converting an original image from a light-spatial form to at least one electro-temporal signal;

(2) at the receiving station:

(a) applying a layer of an imaging suspension comprising a plurality of finely divided electrically photosensitive particles in a carrier liquid between at least one electrode pair, said electrode pair comprising an injecting and a blocking electrode;

(b) subjecting said suspension to an applied electric field between said electrodes having a field strength of from about 0.1 to about 1 volt/micron whereby electrophoretic deposition of said particles onto the injecting electrode occurs;

(c) paraxially scanning said injecting electrode with a source of uniform electromagnetic radiation;

(3) transmitting said electro-temporal signal from the transmission station to the receiving station: and (a) applying the electro-temporal signal comprising a modulated voltage creating a field strength in excess of about 10 volts/micron to the blocking electrode of said electrode pair, whereby upon coincidence of said scanning uniform light and said modulated voltage, photoelectrophoretic charge exchange and reverse particle migration occurs to the blocking electrode resulting in image formation.

3. A method of facsimile transmission from a transmission station to a receiving station and photoelectrophoretic reproduction at said receiving station comprising the steps of:

(1) at the transmission station:

(a) converting an original image from a light-spatial form to electro-temporal signals corresponding to the red, green and blue primary color components of said original;

(2) at the receiving station:

(a) establishing three sets of electrode pairs adapted to operate in concert with each other to synchronously pass a transfer web therebetween, each electrode pair being adapted to impose or superimpose an image on said web to produce a full color reproduction of said original;

(b) applying a layer of an imaging suspension comprising a plurality of finely divided particles in a carrier liquid between each electrode pair, each electrode pair being comprised of injecting and blocking electrodes, the imaging suspension applied to an electrode pair comprising an electrically photosensitive yellow pigment in a carrier liquid, the imaging suspension applied to another electrode pair comprising an electrically photosensitive magenta pigment in a carrier liquid and the imaging suspension applied to another electrode pair comprising an electrically photosensitive cyan pigment in a carrier liquid;

(c) subjecting each suspension to an applied electric field between said electrode having a field strength of from about 0.1 to about 1 volt/micron, whereby electrophoretic deposition of said particles onto the respective injecting electrodes occurs;

(d) paraxially scanning each injecting electrode with a source of uniform electromagnetic radiation;

(3) transmitting each of said electro-temporal signals from the transmission station to the receiving station;

(a) applying the electro-temporal signal corresponding to a first primary color component of the original and comprising a modulated voltage creating a field strength in excess of about 10 volts/micron to the blocking electrode of an electrode pair, whereby upon coincidence of said scanning uniform light and said modulated voltage, photoelectrophoretic charge exchange and reverse particle migration occurs to the blocking electrode resulting in the formation of a first corresponding separation image;

(b) passing a transfer web through said electrode pair whereby said first separation image is transferred to said transfer web and thereafter, passing said first separation image-containing transfer web between another electrode pair;

(c) applying a delayed electro-temporal signal corresponding to a second primary color component of the original and comprising a modulated voltage creating a field strength in excess of about 10 volts/micron to the blocking electrode of said electrode pair, the application of said signal being delayed until the first separation image-containing transfer web is adapted to pass through said electrode pair, whereby upon coincidence of said scanning uniform light source and said modulated voltage, photoelectrophoretic charge exchange and reverse particle migration occurs to the blocking electrode resulting in formation and superimposition of a second corresponding separation image upon said first separation image;

(d) passing the resulting image containing transfer web between another electrode pair;

(e) applying a delayed electro-temporal signal corresponding to a third primary color component of the original and comprising a modulated voltage creating a field strength in excess of about 10 volts/micron to the blocking electrode of said electrode pair, the application of said signal being delayed until the image-containing transfer web is adapted to pass through said electrode pair, whereby upon concidence of said scanning uniform light source and said modulated voltage, photoelectrophoretic charge exchange and reverse particle migration occurs to the blocking electrode resulting in formation and superimposition of a third corresponding separation image upon said image-containing transfer web, the correspondence between the applied signal and the separation image formed by an electrode pair being such that the blue signal forms a yellow image, the green signal forms a magenta image and the red signal forms a cyan image, thereby producing a full color facsimile of the original.

4. A method as defined in claim 3 wherein at the transmission station the generated electro-temporal signals are color corrected prior to transmission.

5. A method as defined in claim 3 wherein at the transmission station the generated electro-temporal signals undergo contrast control.

References Cited

UNITED STATES PATENTS

| | | | |
|---|---|---|---|
| 3,384,565 | 5/1968 | Tulogin et al. | 204—181 |
| 3,384,566 | 5/1968 | Clark | 204—181 |
| 3,565,612 | 2/1971 | Clark | 96—1 |
| 3,573,904 | 4/1971 | Clark | 96—1 |
| 3,548,094 | 12/1970 | Schlein | 178—6.6 |
| 3,301,947 | 1/1967 | Stone | 178—6.6 |
| 3,523,158 | 8/1970 | Zaphirpoulos | 178—5.2 |

GEORGE F. LESMES, Primary Examiner

J. C. COOPER III, Assistant Examiner

U.S. Cl. X.R.

96—1 R, 1.3; 178—5.2 A, 6.6 A; 204—181; 346—74 ES